US008452872B2

(12) United States Patent
Castro Castro et al.

(10) Patent No.: US 8,452,872 B2
(45) Date of Patent: May 28, 2013

(54) METHOD, APPARATUS AND COMPUTER PROGRAM FOR ENFORCING POLICY ACROSS ASSOCIATED SESSIONS TAKING INTO ACCOUNT A TOTAL USAGE QUOTA FOR ASSOCIATED USER

(75) Inventors: Fabian Castro Castro, Madrid (ES); Avelina Pardo-Blazquez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/384,919

(22) PCT Filed: Aug. 18, 2009

(86) PCT No.: PCT/EP2009/060690
§ 371 (c)(1),
(2), (4) Date: Jan. 19, 2012

(87) PCT Pub. No.: WO2011/020498
PCT Pub. Date: Feb. 24, 2011

(65) Prior Publication Data
US 2012/0117235 A1    May 10, 2012

(51) Int. Cl.
*G06F 15/173*      (2006.01)
(52) U.S. Cl.
USPC .......................................................... 709/224
(58) Field of Classification Search
None
See application file for complete search history.

(56) References Cited

U.S. PATENT DOCUMENTS

| | | | |
|---|---|---|---|
| 7,698,398 B1* | 4/2010 | Lai | 709/223 |
| 7,908,380 B1* | 3/2011 | Chu et al. | 709/227 |
| 2003/0105863 A1* | 6/2003 | Hegli et al. | 709/225 |
| 2004/0193513 A1* | 9/2004 | Pruss et al. | 705/30 |
| 2004/0199634 A1* | 10/2004 | Jackowski et al. | 709/226 |
| 2005/0026558 A1 | 2/2005 | Stura et al. | |
| 2005/0120107 A1* | 6/2005 | Kagan et al. | 709/223 |
| 2005/0138162 A1* | 6/2005 | Byrnes | 709/223 |
| 2006/0023711 A1* | 2/2006 | Perret et al. | 370/389 |
| 2006/0031504 A1* | 2/2006 | Hegli et al. | 709/225 |
| 2006/0114913 A1* | 6/2006 | Cai et al. | 370/395.52 |
| 2006/0190281 A1* | 8/2006 | Kott et al. | 705/1 |
| 2007/0192326 A1* | 8/2007 | Angal et al. | 707/10 |
| 2009/0059957 A1* | 3/2009 | Bagepalli et al. | 370/469 |
| 2009/0292927 A1* | 11/2009 | Wenzel et al. | 713/185 |
| 2010/0010922 A1* | 1/2010 | Foottit et al. | 705/30 |

OTHER PUBLICATIONS

3rd Generation Partnership Project. "Technical Specification Group Services and System Aspects; Policy and Charging Control Architecture (Release 9)." 3GPP TS 23.203 V9.1.0, Jun. 2009, pp. 1-116, Sophia-Antipolis Cedex, France.

(Continued)

*Primary Examiner* — Scott Christensen
(74) *Attorney, Agent, or Firm* — Coats & Bennett, P.L.L.C.

(57) ABSTRACT

A server configured to provide a policy decision point for a packet-based communication network. The server comprises a user account manager for maintaining and/or determining, for each of a plurality of users, an available total usage quota and a set of registered, linked connection identifiers. A request handler is provided for receiving from a policy enforcement point, a request for allocation of a quota in respect of a packet session associated with a specified connection identifier. A quota determiner responds to receipt of a quota request by determining a quota for said packet session taking into account the total usage quota for the associated user and any currently ongoing sessions associated with other connection identifiers belonging to the same set as said specified connection identifier. A responder is provided for sending the determined quota to said policy enforcement point.

20 Claims, 6 Drawing Sheets

OTHER PUBLICATIONS

3rd Generation Partnership Project. "Technical Specification Group Service and System Aspects; Telecommunication Management; Charging Management; Diameter Charging Applications (Release 9)." 3GPP TS 32.299 V9.0.0, Jun. 2009, pp. 1-142, Sophia-Antipolis Cedex, France.

* cited by examiner

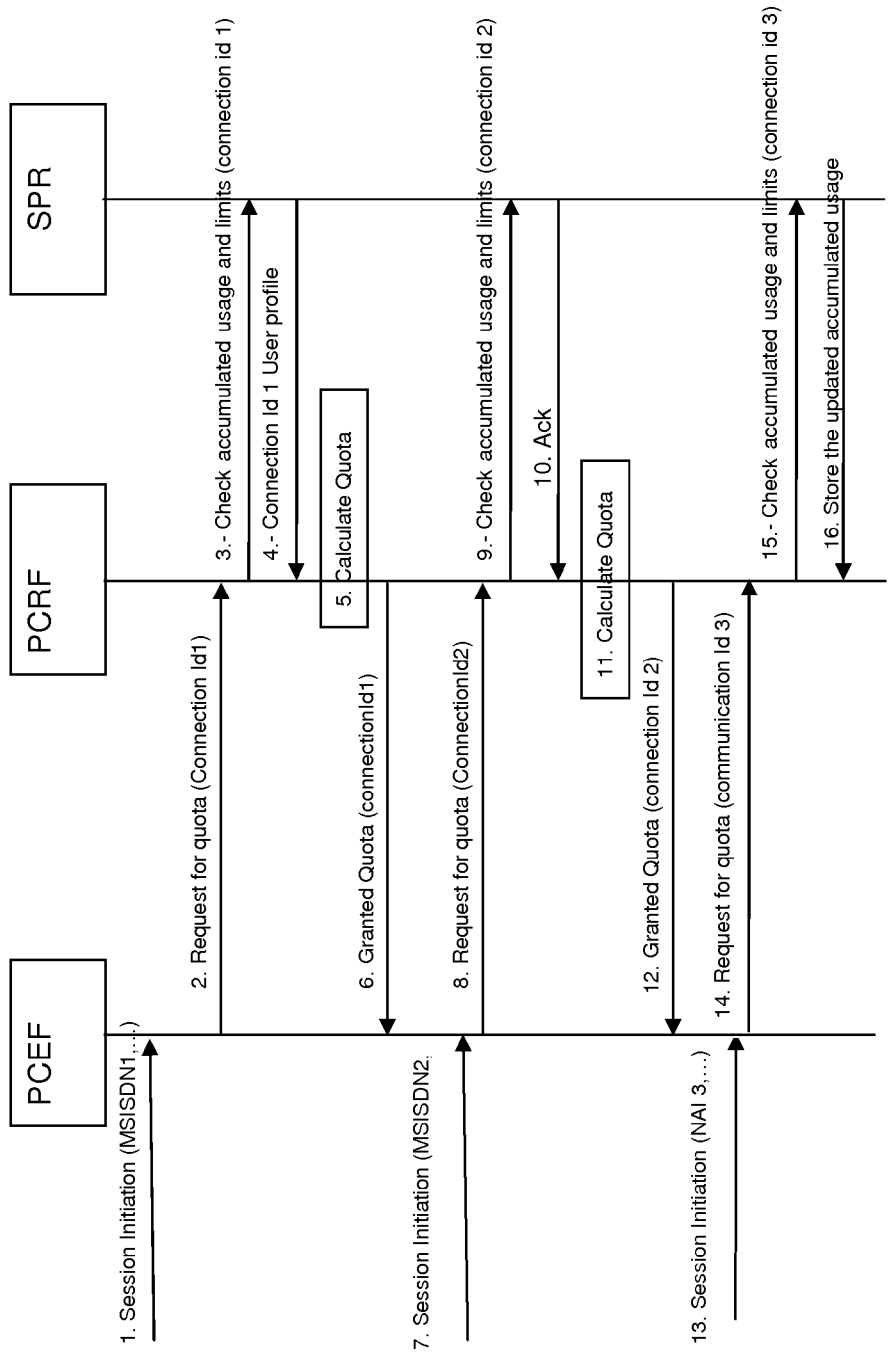

METHOD, APPARATUS AND COMPUTER PROGRAM FOR ENFORCING POLICY ACROSS ASSOCIATED SESSIONS TAKING INTO ACCOUNT A TOTAL USAGE QUOTA FOR ASSOCIATED USER

TECHNICAL FIELD

The present invention relates to a method and apparatus for enforcing a policy or policies across two or more associated sessions within a packet communication system. The invention is applicable in particular to the enforcement of policies across two or more sessions having respective, but associated, connection identifiers.

BACKGROUND

Telecommunications services provided over an IP Connectivity Access Network (IP-CAN) can be subject to charging and policy control mechanisms. This includes Quality of Service (QoS) control. Accordingly, some telecommunications systems incorporate so-called Policy and Charging Control (PCC) architectures to provide this control. 3GPP TS 23.203 V8.6.0 (and earlier versions of Release 7) describes such a PCC architecture in respect of packet flows in an IP-CAN session established by a user terminal through an Evolved 3GPP telecommunications system, including both 3GPP accesses (GERAN/UTRAN/E-UTRAN) and Non-3GPP accesses. FIG. 1 illustrates schematically an example of the PCC architecture described in 3GPP TS 23.203 that comprises a Policy and Charging Enforcement Function (PCEF), a Bearer Binding and Event Reporting Function (BBERF), a Policy and Charging Rules Function (PCRF), an Application Function (AF), an Online Charging System (OCS), an Offline Charging System (OFCS), and a Subscription Profile Repository (SPR).

The PCRF is a functional element that encompasses policy control decision and flow based charging control functionalities, a combination of the functionality of the Policy Decision Function (PDF) and the Charging Rule Function (CRF) defined in release 6 of the 3GPP specification. A PCRF can be implemented as a standalone node and behaves as a Policy Decision Point (PDP), or Policy Server (PS), that stores user data related to QoS enforcement, access control lists, etc. The PCRF provides policy and charging control for the media components negotiated between the user terminal and the AF. The PCRF receives session and media related information from the AF and informs the AF of traffic plane events. The PCRF also provides network control regarding the service data flow detection, gating, QoS and flow based charging (except credit management) towards the PCEF. The PCRF can provision PCC rules and PCC decisions to the PCEF via the Gx reference point. Criteria such as the QoS subscription information may be used together with policy rules such as, service-based, subscription-based, or pre-defined PCRF internal policies to derive the authorized QoS to be enforced for a service data flow. The PCRF PCC decisions may be based on one or more of the following:

information obtained from the AF via the Rx reference point, e.g. the session, media and subscriber related information;
information obtained from the PCEF via the Gx reference point, e.g. IP-CAN bearer attributes, request type, subscriber related information and location information;
information obtained from the SPR via the Sp reference point, e.g. subscriber and service related data;
information pre-defined in the PCRF; and
information obtained from BBERF via the so-called Gxx reference point.

The PCEF is a functional entity that behaves as a Policy Enforcing Point (PEP) for enforcing decisions instructed by the PCRF and the OCS. The PCEF provides service data flow detection (based on the service data flow filter filters defined in the PCC rules) to capture and analyse any user and signalling traffic, to identify the user and to capture details of the service(s) being used. The PCEF can then communicate this information to the PCRF over the Gx interface, to the OCS over the Gy interface, and to the OFCS over the Gz interface. The PCEF enforces QoS control according to the QoS authorised by the PCRF. The PCEF is typically deployed functionally between an access gateway giving access to a packet data network and an application server giving access to a particular service or set of services. The PCEF is preferably physically co-located within the gateway node implementing the IP access to the PDN. As such, in a GPRS core network the PCEF is located within the GPRS Gateway Support Node (GGSN), whilst in the case of a CDMA2000 network the PCEF may be located in a Packet Data Serving Node (PDSN), and in a WLAN network the PCEF may be located in a Packet Data Gateway (PDG).

The BBERF functionality includes bearer binding, uplink bearer binding verification and event reporting to the PCRF. For example, in a GPRS core network the bearer binding mechanism associates the PCC rule with the PDP context that is to carry the service data flow. When GPRS Tunnelling Protocol (GTP) is used between the BBERF and the PCEF then bearer binding is performed by the PCEF. Alternatively, when Proxy Mobile IP (PMIP) is used between the BBERF and the PCEF, instead of GTP, then bearer binding is performed by the BBERF.

The OCS provides authorization for the usage of network resources based on the provisioned data and the user activity information it receives from PCEF. This authorization is be granted by the OCS prior to the actual resource usage. When receiving a network resource usage request, the network assembles the relevant charging information and generates a charging event towards the OCS in real-time. The OCS then returns an appropriate resource usage authorization over the Gy interface. The resource usage authorization may be limited in its scope (e.g. volume of data or duration) therefore this authorization may have to be renewed from time to time as long as the user's resource usage persists. The OCS can support time, volume and event-based charging.

The AF is an element offering applications that require policy and/or charging control of the IP-CAN user plane behaviour. The AF communicates with the PCRF over the Rx interface to transfer dynamic session information (e.g. a description of the media to be delivered in the transport layer) required for PCRF decisions, as well as to receive IP-CAN specific information and notifications about IP-CAN bearer level events. One example of an AF is the P-CSCF of the IP Multimedia Core Network (IM CN) subsystem. In the case of a P-CSCF, the information communicated over the Rx interface is derived from the P-CSCF session information (e.g. SDP when SIP is used for signalling) and it mainly includes media components. A media component comprises a set of IP flows, each of which is described by a 5-tuple, the media type and required bandwidth.

The SPR contains all subscriber/subscription related information needed for subscription-based policies and IP-CAN bearer level PCC rules by the PCRF. The Sp interface allows the PCRF to request subscription information related to the IP-CAN transport level policies from the SPR based on a subscriber ID and other IP-CAN session attributes.

As considered above, one or more of the policies implemented by the PCC architecture may relate to a QoS to be applied to a user and/or session. A basic QoS policy function may comprise, for example, enforcing rules for limiting the bandwidth of a certain communication during a certain period or when a usage quota is exceeded (e.g. measured as a number of data packets sent and/or received). This may be done for the dual purposes of differentiating user service levels to allow for differentiated pricing plans and in order to prevent a small number of users "hogging" large amounts of available access bandwidth to the detriment of other users.

As currently considered, the QoS policy rules applicable to a communication (an "IP-CAN" session according to the terminology of TS 23.203) involving a user terminal depend on the QoS category associated with an identifier received at establishment of the communication. The nature of the identifier (referred to herein as a "connection identifier") can vary depending on the type of access which the user terminal employs in order to connect to the system. Examples of connection identifier types are a Network Access Identity (NAI) in case of X-DSL access and a Mobile Subscriber Integrated Services Digital Network Number (MSISDN) used to identify a subscription in a GSM or UMTS cellular network. Other connection identifiers include International Mobile Subscriber Identity (IMSI), Mobile Station Identifier (MSID), and Mobile Identification Number (MIN). Connection identifiers are generally registered within the network (e.g. at the SPR) when a subscription is set up for a user. Of course, further identifiers may be added subsequently to a subscription.

Table 1 below illustrates three service plans that an operator may wish to offer to subscribers, namely Voice and Data— "AllnOne", Only Data—"Premium", and Only Data—"Professional". Implementation of such plans requires monitoring data usage associated with a connection identifier, and detecting when that usage has exceeded a subscriber limit. In a PCC architecture, the PCEF can report usage consumed by a connection identifier to the PCRF (e.g. by extending the functionality of the existing Gx interface). The PCRF acts on the reported usage, e.g. by throttling back bandwidth when a subscription limit is reached. Usage limits and accumulated usage may be stored internally in the PCRF or the SPR, e.g. to allow control of a new session associated with a connection identifier to continue where a previous connection finished. In more detail, an example procedure might involve the following steps:

1. The user initiates an IP-CAN session for a given connection identifier (e.g. MSISDN).
2. The PCEF initiates a Gx session requesting applicable PCC rules and QoS values by sending a CCR initial message.
3. The PCRF retrieves the accumulated usage and evaluates the QoS and access policies. It also computes the granted volume/time quota taking into account the usage limits configured for the connection identifier.
4. The PCRF sends the PCC rules, QoS values and granted quota to the PCEF within a CCA message.
5. The User starts to download/upload traffic. The PCEF discounts the usage from the granted volume/time quota for that connection identifier.
6. When the granted quota is exhausted, the PCEF requests a reauthorization to the PCRF by sending a CCR update message, and in the meantime buffers the user data. This message includes the volume and time used from the last usage reporting message.
7. The PCRF accumulates the usage reporting for that connection identifier. It re-evaluates the QoS and access policies. As the usage limit has been exceeded, the evaluation results in a new QoS profile.
8. The PCRF sends the new PCC rules and QoS profile to the PCEF in a CCA message.
9. The PCEF enforces the new QoS profile, allowing user traffic to flow again but with a reduced bandwidth.

At IP-CAN session termination, the PCRF receives from the PCEF a final usage report, and updates and stores the accumulated usage information. This will be the starting point for the next session.

It will be appreciated that service plans similar to that illustrated in Table 1 may be implemented based upon other types of quota. For example, for VoIP services, a quota may be specified in terms of available talk minutes. A quota may alternatively be specified as a number of times that a particular service may be accessed. All quotas may of course be incorporated into a single service plan.

A problem arises when a given user establishes a second IP-CAN with a second connection identifier whilst a first IP-CAN already exists and is associated with a first, different connection identifier. In this case, according to current implementations, the PCEF associated with the second IP-CAN (which may or may not be the PCEF associated with the first IP-CAN session) will receive from the PCRF, for example, a remaining data volume quota identical to the last quota sent to the PCEF associated with the first IP-CANN. This may result in the user being able to consume significantly more than his or her remaining quota. A similar problem arises when two or more family members, associated with a "family bundle" plan, establish parallel IP-CANs using respective, different, connection identifiers. Current solutions to these problems require different service plans for different connection identifiers. This complicates the offerings that an operator can make to potential subscribers, particularly for those operators owning fixed and mobile networks or deploying new SAE networks where LTE, WiMax and 2G/3G accesses can exist in parallel.

SUMMARY

It is an object of the present invention to provide a method and apparatus that allows a quota or quotas to be shared between a set of connection identifiers associated with a user, where the user might be an individual, a family, a company, etc, in such a way that it is unlikely that the user will exceed its quota(s). The user may for example be associated with a single subscription.

According to a first aspect of the present invention there is provided a server configured to provide a policy decision point for a packet-based communication network. The server comprises a user account manager for maintaining and/or determining, for each of a plurality of users, an available total usage quota and a set of registered, linked connection identifiers. A request handler is provided for receiving from a policy enforcement point, a request for allocation of a quota in respect of a packet session associated with a specified connection identifier. A quota determiner responds to receipt of a quota request by determining a quota for said packet session taking into account the total usage quota for the associated user and any currently ongoing sessions associated with other connection identifiers belonging to the same set as said specified connection identifier. A responder is provided for sending the determined quota to said policy enforcement point.

Embodiments of the invention allow multiple connection identifiers, associated with a common user, to share a usage quota or quotas whilst minimising the risk to a network operator or service provider that the quota or quotas will be exceeded.

The user account manager may be configured to maintain and/or determine said total usage quota on a per user and per service basis, and said request for allocation of a quota is in respect of a specific service. Alternatively, the user account manager may be configured to maintain and/or determine said total usage quota as a total quota per user for all packet-based services.

The user account manager may be configured to update the available total usage quota taking into account said determined quota.

The server may be configured to handle connection identifiers associated with a wide range of access networks and user terminals. Example connection identifiers include; MSISDN, NAI, MSID, MIN, and IMSI.

The quota determiner may be configured to determine a quota by determining consumed but previously unreported usage in respect of any said currently ongoing sessions, and determining an updated available total usage quota taking into account that consumed usage. Quotas are then allocated to both the new and the pre-existing session(s) from the updated available total usage quota. The quota determiner may be configured to allocate all of said updated available total usage quota between the new and pre-existing sessions.

In an alternative embodiment, the quota determiner may be configured to determine a quota by deducting from said total usage quota, quotas allocated to said currently ongoing sessions, and reserving an amount of quota as a remaining total usage quota for sessions to be subsequently established. The remainder, or a part of the remainder, is allocated as a quota for the session associated with said specified connection identifier. The quota determiner may be configured, in the event that said remainder represents an insufficient quota, to determine consumed but previously unreported usage in respect of any said currently ongoing sessions. It then determines an updated available total usage quota taking into account that consumed usage, and allocates quotas to both the new and the pre-existing session(s) from the updated available total usage quota.

The server may be configured to provide said policy decision point as a Policy and Charging Rules Function of a 3GPP Policy and Charging Control architecture. In this case, the quota determiner is configured to determine consumed but previously unreported usage in respect of any said currently ongoing sessions by sending a RAR message over a Gx interface in respect of the or each currently ongoing session.

Examples of quotas that may be allocated by the server include, by way of example, data volume, bandwidth, and time period.

According to a second aspect of the present invention there is provided a method of allocating user usage quotas within a packet-based communication network. The method comprises maintaining and/or determining, for each of a plurality of users, an available total usage quota and a set of registered, linked connection identifiers, and receiving from a policy enforcement point, a request for allocation of a quota in respect of a packet session associated with a specified connection identifier. Receipt of a quota request is responded to by determining a quota for said packet session taking into account the total usage quota for the associated user and any currently ongoing sessions associated with other connection identifiers belonging to the same set as said specified connection identifier, and sending the determined quota to said policy enforcement point.

The method may be implemented within a network server as part of a 3GPP Policy and Charging Rules Function.

The total usage quota may be defined on a per user and service basis, and said request for allocation of a quota is in respect of a specific service. Alternatively, the total usage quota may be defined as a total quota per user for all packet-based services.

The step of determining a quota for said packet session may comprise determining consumed but previously unreported usage in respect of any said currently ongoing sessions, and determining an updated available total usage quota taking into account that consumed usage. Quotas to both the new and the pre-existing session(s) are allocated from the updated available total usage quota.

Alternatively, the step of determining a quota for said packet session may comprise deducting from said total usage quota, quotas allocated to said currently ongoing sessions, and reserving an amount of quota as a remaining total usage quota for sessions to be subsequently established. The remainder, or a part of the remainder, is allocated as a quota for the session associated with said specified connection identifier.

According to a third aspect of the present invention there is provided a computer program for causing a computer to perform the steps of:

maintaining and/or determining, for each of a plurality of users, an available total usage quota and a set of registered, linked connection identifiers;

receiving from a policy enforcement point, a request for allocation of a quota in respect of a packet session associated with a specified connection identifier;

responding to receipt of a quota request by determining a quota for said packet session taking into account the total usage quota for the associated user and any currently ongoing sessions associated with other connection identifiers belonging to the same set as said specified connection identifier; and sending the determined quota to said policy enforcement point.

DETAILED DESCRIPTION

Problems associated with the application of a common service plan to parallel sessions involving different connection identifiers have been discussed above. In order to address these problems, it is proposed here to enhance the QoS policy function within a PSS architecture. The main impact resides on the PCRF entity which is now required to:

Retrieve a set of connection identifiers sharing the same QoS policies such as a common usage limit, bandwidth, or time restriction. An implementation may store the set of linked connection identifiers within the PCRF database or within the SPR. Connection identifiers will typically be registered against a subscription (or other user account type, e.g. "pay-as-you-go")

Apply QoS policy rules to a new communication session established with a connection identifier (of the set) based on QoS policy rules already applied to ongoing sessions established with other connection identifiers of the set (concurrent sessions).

When a PCEF requests quota, the PCRF calculates a new quota taking into account any existing communication sessions for linked connection identifiers, the common usage limits, and the common accumulated usage registered at that moment.

The PCRF is configured to ensure that the sum of the quotas issued for all parallel communication sessions (for connection identifiers of the linked set) does not exceed the configured volume, time limits, etc.

The PCRF shall preferably be able to perform the QoS policy function independently of the network access types and terminal equipments used in the different concurrent communication sessions.

The PCEF remains largely, or even wholly, unaffected by the introduction of the enhanced PCRF. This is a significant benefit, as it reduces the impact of the new functionality within the network, and therefore makes a successful introduction more likely.

Figure 1:
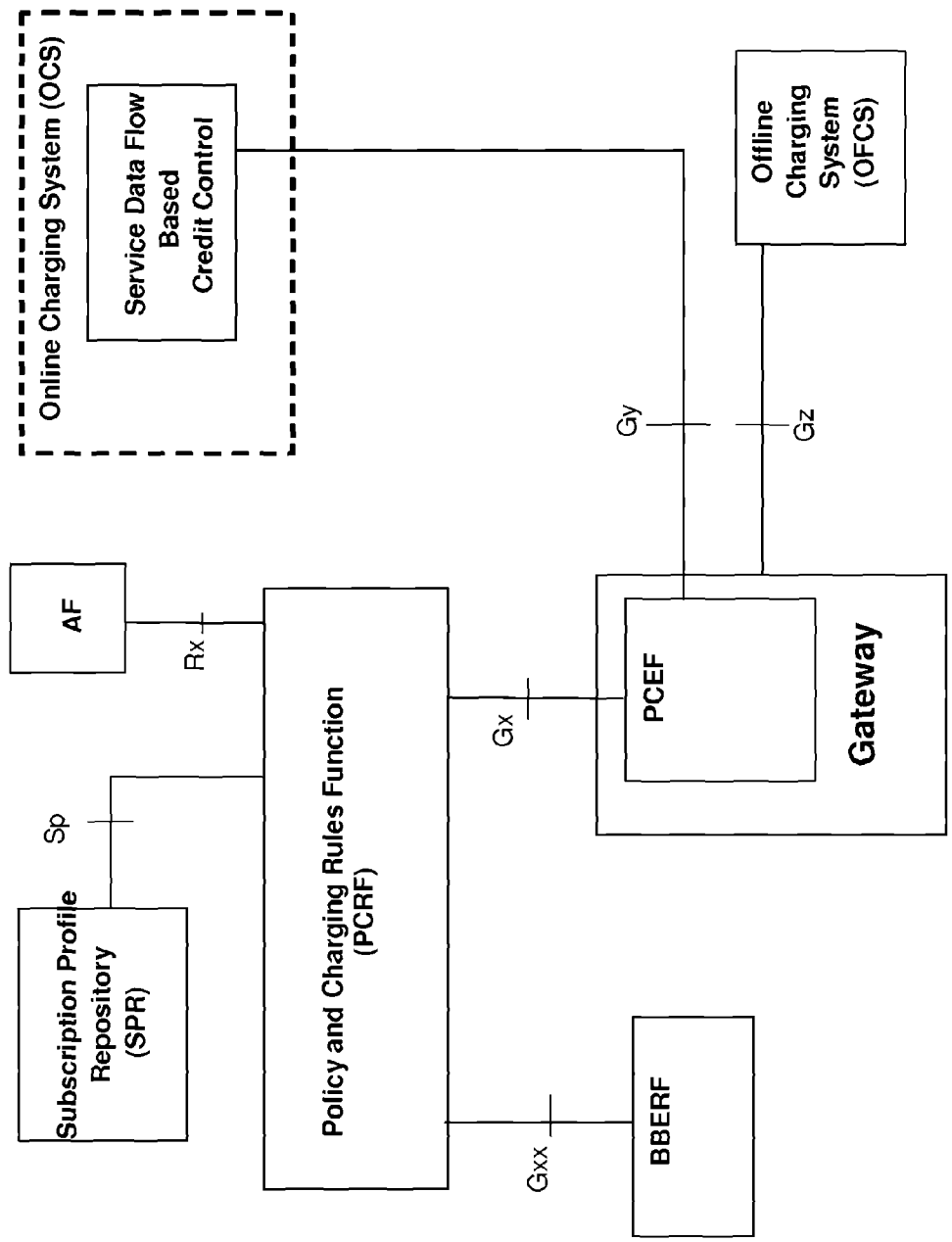
FIG. 1 illustrates schematically a Policy and Charging Control architecture within a packet communication network.
Figure 2:
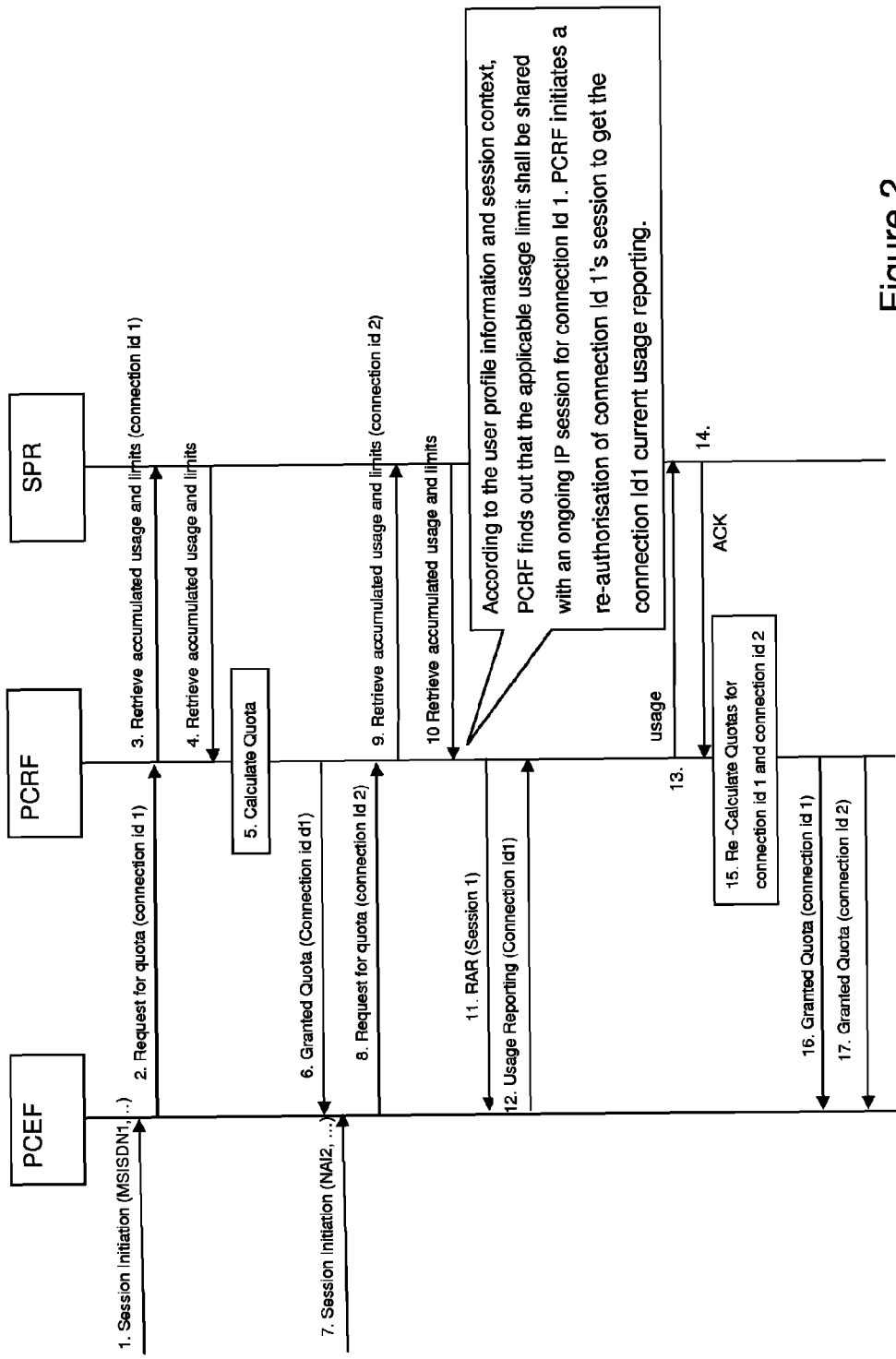
FIG. 2 illustrates a process for sharing a quota between a plurality of sessions associated with respective connection identifiers of a given user.

FIG. 2 illustrates a procedure for enforcing policies associated with a single service plan across parallel IP-CAN sessions, and involving a PCEF, PCRF, and SPR. When a first communication session is established, the PCRF grants the largest available quota, considering the common usage limits and the currently registered common accumulated usage. When a new communication session is established, and the PCEF requests a quota for that session, the previously established communication session is reauthorized in order to take into account the new session and its allocated quota.

Figure 3B:
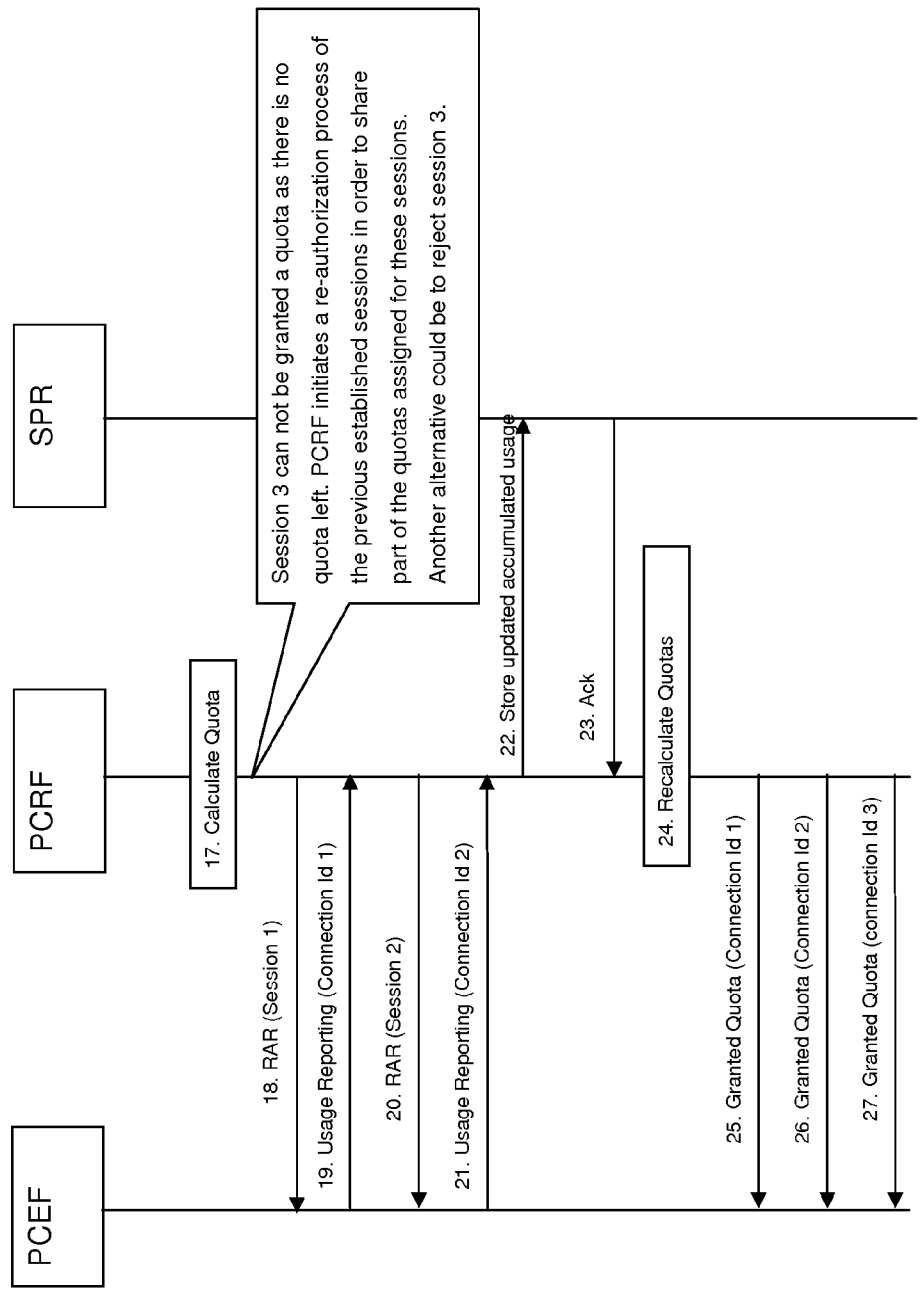
FIGS. 3A and B illustrates an alternative process for sharing a quota between a plurality of sessions associated with respective connection identifiers of a given user.

Considering this procedure in more detail, FIGS. 3A and B show the following steps:

1. A user connects to the network with connection identifier "1" (e.g. MSISDN).
2. The PCEF requests from the PCRF, PCC rules and QoS policies, including a usage quota, for connection identifier 1.
3. The PCRF requests from the SPR a user profile for connection identifier 1, including a set of linked connection identifiers, a current accumulated usage for this set of connection identifiers, and a common usage limit.
4. The SPR returns the requested information to the PCRF.
5. The PCRF computes the granted usage quota for the communication session.
6. The PCRF sends the PCC rules and QoS policies, including the computed usage quota, to the PCEF.
7. Either the same user or another user starts a new communication session with a connection identifier "2" (e.g. NAI).
8. The PCEF requests PCC rules and QoS policies for this new communication session associated with connection identifier 2, including a granted usage quota.
9. The PCRF requests from the SPR the user profile for connection identifier 2, including the set of linked connection identifiers, the currently accumulated usage for this set of connection identifiers, and the common usage limits.
10. The SPR sends the user profile to the PCRF.
11. The PCRF determines from the set of linked connection identifiers that an associated session involving connection identifier 1 is currently ongoing, and that a common usage limit is shared between all communication sessions for connection identifiers within the set.
12. The PCRF initiates a reauthorisation of the communication session for connection identifier 1 by sending a RAR message to the PCEF (the response RAA is not shown for simplicity).
13. The PCEF reacts by requesting new PCC rules and QoS policies, including a granted quota for the connection identifier 1. The request includes the current usage report, e.g. consumption since last reporting to the PCRF.
14. The PCRF records the received usage report in the SPR.
15. SPR ACK.
16. The PCRF recalculates the granted usage quotas for connection identifiers 1 and 2.
17. The PCRF sends the new PCC rules and QoS policies for the communication session for connection identifier 1, to the PCEF.
18. The PCRF sends the new PCC rules and QoS policies for the communication session for connection identifier 2, to the PCEF.

A basic algorithm for sharing the quota between multiple active connection identifiers might be simply to evenly split the total available quota. More advanced algorithms can be used however, taking into account session information (e.g. Access Network type, Radio Access Type, User Equipment, APN) or the user profile (e.g. age, user category). In the case of a "family bundle", quotas may be divided based upon family member identity.

An alternative approach to ensuring that a remaining quota is not exceeded involves capping a quota allocated to a connection identifier at some level below the maximum available quota. This leaves some quota left for subsequent allocation to a different connection identifier. The subsequently allocated quota may also be capped (assuming of course that sufficient quota remains). The capped quota can be different for different communication sessions, depending on the nature of the reported service(s) and the access network.

Consider for example a family bundle in which three users (each associated with an own connection identifier) share a limit of 3 Mb per month, and they have currently accumulated 2500 Kbytes of usage. The maximum quota value is restricted to 300 Kbytes. Table 2 below illustrates the subscription data held in the SPR. Assume now that a member of the family (using MSISDN-1) initiates a communication and that, at this stage, no other concurrent communication session has been established for the family. The PCRF calculates the quota considering:

$$\text{Quota}=\text{Minimum of }((3000\text{ Kbytes}-2500\text{ Kbytes}), 300\text{ Kbytes})=300\text{ Kbytes}$$

The result, shown in Table 3 below, is preferably stored by the PCRF in the SPR, linked to Table 2.

A second communication session is then established by a second family member (using MSISDN-2). No usage reporting has been received in the meantime from the communication session established by MSISDN-1, so the accumulated usage recorded by the SPR in Table 2 remains at 2500 Kbytes. The PCRF calculates the quota to be returned in respect of MSISDN-2 considering:

$$\text{Quota}=\text{Minimum }((3000\text{ Kbytes}-2500\text{ Kbytes}-300\text{ Kbytes}), 300\text{ Kbytes})=200\text{ Kbytes}$$

The PCRF then updates Table 3 stored in the SPR, resulting in Table 4.

A third communication session is established by a third family member (using NAI-3) and no usage reporting has been received in the meantime from the previous communication sessions established by MSISDN-1 and MSISDN-2. The accumulated usage therefore remains as 2500 Kbytes. The quota for NAI-3 is determined as:

Quota=Minimum ((3000 Kbytes−2500 Kbytes−300 Kbytes−200 Kbytes), 300 Kbytes)=0 Kbytes No quota remains for NAI-3 and, as a consequence, the PCEF closes the associated session.

Rather than close the session for NAI-3, upon determining that no or insufficient quota remains, the PCRF may initiate a process similar to the one described with reference to FIG. 2, that is initiating reauthorization of the previously established communication sessions in order to share part of the quotas assigned for these communication sessions with the new communication session. If, for example, at reauthorisation, the PCEF reports the following usage levels:

Session 1: 100 Kbytes
Session 2: 100 Kbytes, then the PCRF recalculates the quotas as:

Total accumulated usage=2500 Kbytes+100 Kbytes+ 100 Kbytes=2700 Kbytes

Remaining=3000 Kbytes−2700 Kbytes=300 Kbytes

The 300 Kbytes should be shared between the three sessions. For example, the PCRF can assign 100 Kbytes of granted quota for each communication session.

FIG. 3 illustrates a procedure for enforcing policies associated with a single service plan across parallel IP-CAN sessions, and involving a PCEF, PCRF, and SPR, according to this modified procedure. The steps shown are as follows:

1.—A user connects to the network with connection identifier 1 (e.g. MSISDN 1).
2.—The PCEF requests from the PCRF, PCC rules and QoS policies, including a usage quota, for connection identifier 1.
3. The PCRF requests from the SPR a user profile for connection identifier 1, including a set of linked connection identifiers, an accumulated usage for this set of connection identifiers, and a common usage limit.
4. The SPR sends the requested information to the PCRF.
5. The PCRF computes a granted usage quota for the communication session as a fraction of the remaining quota.
6. The PCRF sends the PCC rules and QoS policies, including the computed granted quota, to the PCEF.
7. The same user or another user starts a new communication session with connection identifier 2 (e.g. MSISDN 2).
8. The PCEF requests from the PCRF, PCC rules and QoS policies for this new communication session for connection identifier 2, including a granted usage quota.
9. The PCRF requests from the SPR, the user profile for connection identifier 2, including the set of linked connection identifiers, the accumulated usage for this set of connection identifiers, and the common usage limit.
10. The SPR sends the user profile to the PCRF.
11. The PCRF, according to the set of linked connection identifiers retrieved from the SPR, knows that the common usage limit shall be shared with other communication sessions for other connection identifiers of the same set. The PCRF assigns another quota slice to communication session 2.
12. The PCRF sends the PCC rules and QoS policies, including the computed granted quota for communication session 2, to the PCEF
13. The same user or another user starts a new communication session with connection identifier 3 (e.g. NAI)
14. The PCEF request PCC rules and QoS policies for this new communication session for connection identifier 3, including a granted usage quota
15. The PCRF requests from the SPR, the user profile for connection identifier 3, including the set of linked connection identifiers, the accumulated usage for this set of connection identifiers and the common usage limits
16. The SPR sends the user profile to the PCRF.
17. The PCRF, according to the set of linked connection identifiers retrieved from the SPR, determines that the common usage limit shall be shared with other communication sessions for other connection identifiers of the same set. The PCRF also determines that there is no quota left for any other connection identifier. The PCRF therefore initiates a reauthorisation process towards the existing communication sessions for other connection identifiers within the set in order to get the latest usage information and determine if there is any quota left to share with the new communication session (session 3).
18. The PCRF sends a reauthorisation request in respect of communication session 1, by sending a RAR message (response RAA is not shown for simplicity).
19. The PCEF request new PCC rules and QoS policies, including a new granted quota for connection identifier 1. The message includes the usage information for connection identifier 1, i.e. consumption since last reporting.
20. The PCRF sends a reauthorisation request for communication session 2 by sending a RAR message (response RAA is not shown for simplicity).
21. The PCEF request new PCC rules and QoS policies, including a new granted quota for connection identifier 2. The message includes the usage information for connection identifier 2, i.e. consumption since last reporting.
22. The PCRF recalculates the granted usage quotas for connection identifiers 1,2 and 3.
23. The PCEF stores the updated accumulated usage in the SPR for the set of connection identifiers.
24. The SPR acknowledges the operation.
25. The PCRF sends the new PCC rules, QoS policies, and granted quota for the communication session for connection identifier 1, to the PCEF.
26. The PCRF sends the new PCC rules, QoS policies, and granted quota for the communication session for connection identifier 2, to the PCEF.
27. The PCRF sends the new PCC rules, QoS policies, and granted quota for the communication session for connection identifier 3, to the PCEF.

Figure 4:
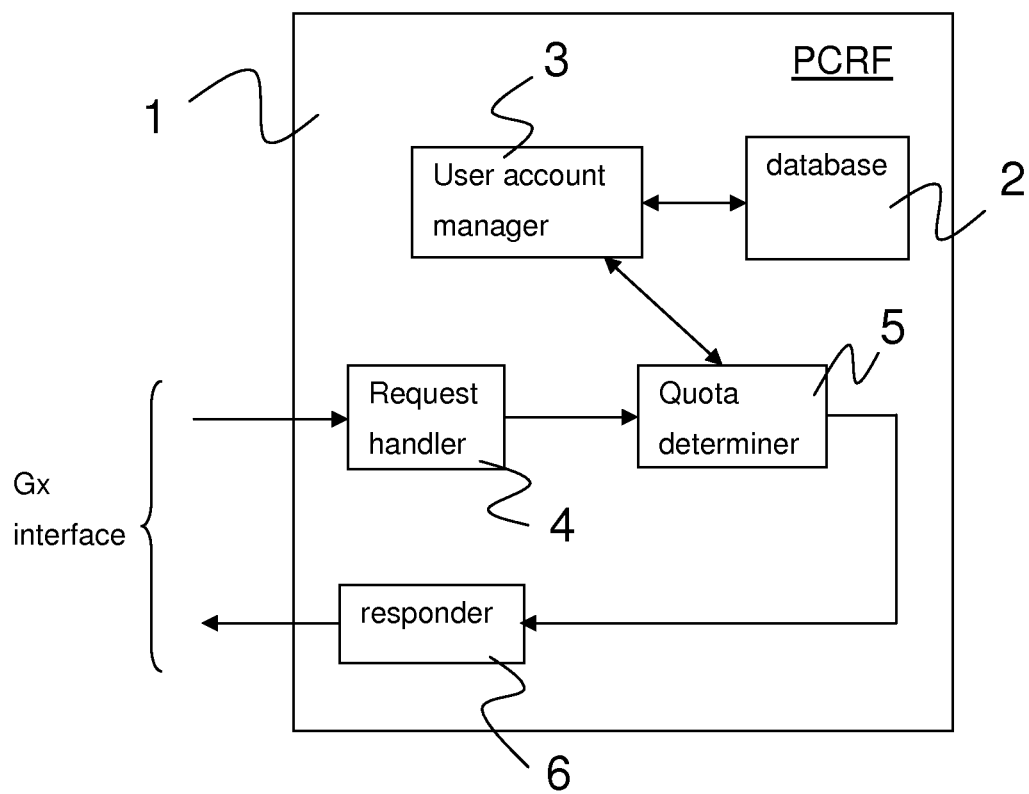
FIG. 4 illustrates schematically a Policy and Charging Rules Function of the Policy and Charging Control architecture of FIG. 1.

FIG. 4 illustrates schematically various functional components of a server 1 configured to implement a PCRF as described above. It will be appreciated that the PCRF may be implemented using appropriate software running on a server computer or computers. A database 2 is shown within the PCRF. This database stores user account data including a total available user usage quota and sets of linked connection identifiers. Of course, this database may actually be implemented in an SPR and accessed by the PCRF via the SP interface. In either case, data in the database 2 is managed by a User Account Manager 3 within the PCRF. This Manager 3 reads quota data from the database 2 and updates the value when quotas have been allocated.

Requests for quota received from a PCEF are received by a Request handler 4. This performs initial process of the request, and passes it to a quota determiner 5, the role of which is to contact the User Account Manager to obtain a current total available quota for the user in questions, as well as the set of connection identifier associated with the user. If the procedure of FIG. 2 is employed, the Quota determiner 5 will send RAR messages to the PCEF(s) in order to determine consumed but unreported usage figures for any ongoing sessions for other connection identifiers of the set. It will then pool the remaining quota and re-allocate quota accordingly via a Responder 6. If the process of FIG. 3 is employed, the Quota determiner 5 will not in the first instance reallocate quota to ongoing sessions, but will rather allocate some fixed amount, less than the total available quota, to the new session. Only if insufficient quota remains will the already allocated quotas be revoked and reissued.

Figure 5:
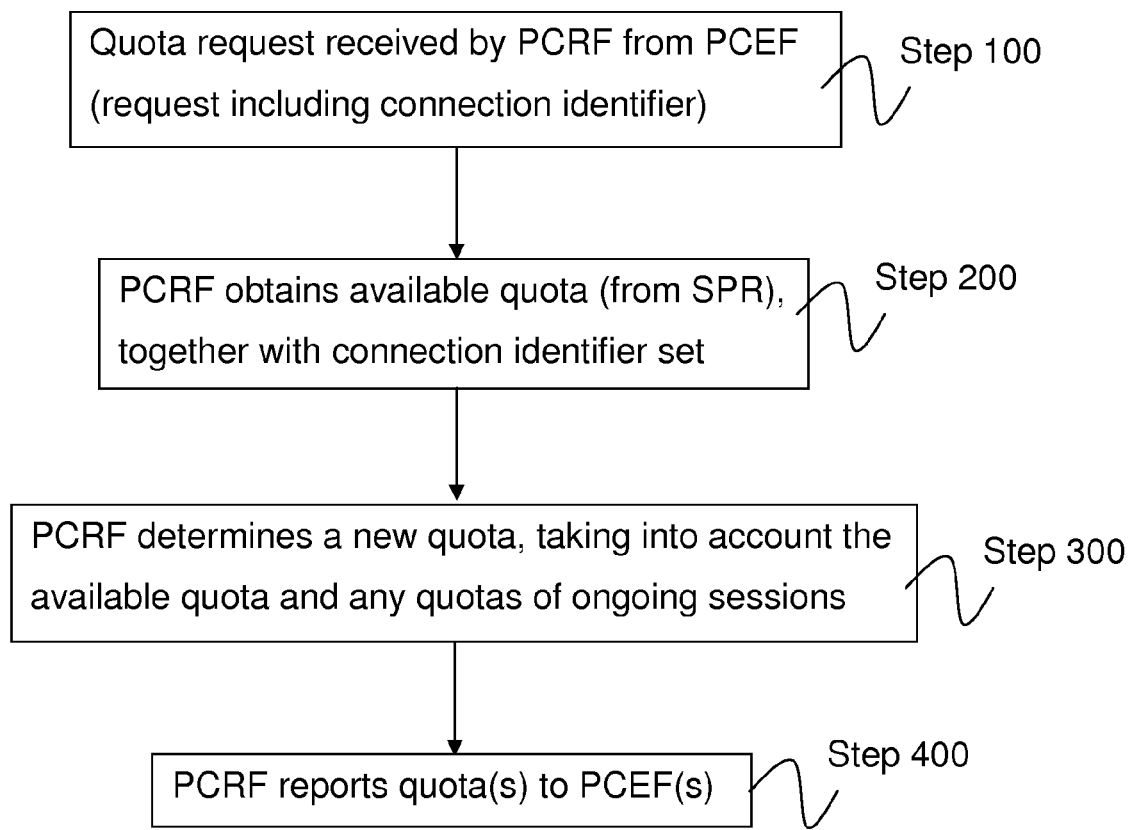
FIG. 5 is a flow diagram of a process for sharing quota at the Policy and Charging Rules Function of FIG. 4.

FIG. 5 is a flow diagram illustrating steps of a generic process for allocating quota in line with the embodiments described above. At step 100, a request for quota is received by the PCRF. This request includes a connection identifier associated with the request, e.g. an MSISDN. At step 200, the PCRF obtains from the SPR a total available quota for the user owning that connection identifier, together with associated connection identifiers. At step 300, the PCRF determines a quota for the new session, taking into account the available quota, and, optionally by obtaining consumed but unreported quota for any ongoing sessions involving the associated connection identifiers. At step 400, the PCRF reports the allocated quota to the PCEF in respect of the requested session. If quotas for other sessions have been re-calculated, the PCRF will also report these to the PCEF(s).

It will be appreciated by the person of skill in the art that various modifications may be made to the above described embodiments without departing from the scope of the present invention. For example, whilst the embodiments have only considered usage control at the level of the communication session, usage control could also be done at the level of a service or group of services (for example services that share the same rating). Consider for example a subscriber with one or several connection identifiers. This user can have established limits of usage for the total traffic, and/or limits relating to a specific service or group of services. A user A, with identities "A@domain.es" and "MSISDNx", might have a combined total limit of 1 Gb per month, with a "sub-limit" of 300 Kbytes for P2P services. Another user might have no traffic limit other than 1 Gb per month for P2P services.

Another example is the family bundle, where a set of individuals share the same limits. A "family" might be a mother, father and children, or it could be employees of a company. A family can have limits relating to the total traffic and also limits for specific services, e.g. P2P, which are managed (as described hereinbefore) according to the various connection identifiers which are linked to the family's subscription. The user in this case represents a set of individuals, associated with a common subscription.

TABLE 1

| Contract | Group | Description | Bandwidth Limit | Quota Limit | Others |
|---|---|---|---|---|---|
| Voice and Data | AllInOne | Voice and Data flat rate | 1 Mb/s | 1 Gb | From 1 Gb the bandwidth is downgraded to 128 Kb/s |
| Only Data | Premium | Intensive Usage | 3.6 Mb/s | 5 Gb | From 5 GB Not access to any service only to the operator portal |
| Only Data | Professional | Sporadic Usage | 3.6 Mb/s | 350 Mb | From 350 Mb Not access to any service only to the operator portal |

TABLE 2

| Commercial offer | |
|---|---|
| List of connection IDs | MSISDN1, MSISDN2, NAI 3 |
| List of Services | (...) |
| Common Usage Limit | 3000 Kbytes per month |
| Maximum Quota | 300 Kbytes |
| Accumulated Usage | 2500 Kbytes |

TABLE 3

| Session | Communication Id | IP Address | Granted quota |
|---|---|---|---|
| Session 1 | MSISDN-1 | IP Address 1 | 300 Kbytes |

TABLE 4

| Session | Connection Id | IP Address | Granted quota |
|---|---|---|---|
| Session 1 | MSISDN-1 | IP Address 1 | 300 Kbytes |
| Session 2 | MSISDN-2 | IP Address 2 | 200 Kbytes |

The invention claimed is:

1. A server configured to provide a policy decision point for a packet-based communication network, the server comprising:

a user account manager configured to perform at least one of a maintaining and a determining, for each of a plurality of users, of an available total usage quota and a set of registered, linked connection identifiers that are associated with a user;

a request handler configured to receive, from a policy enforcement point, a request for allocation of a quota with respect to a packet session associated with a specified connection identifier;

a quota determiner configured to respond to a receipt of a quota request by determining a quota for said packet session taking into account the available total usage quota for the associated user and consumed but previously unreported usage quota in respect of any currently ongoing sessions associated with other connection identifiers belonging to the same set as said specified connection identifier, the previously unreported usage quota comprising usage quota unreported before receipt of the request; and a responder configured to send the determined quota to said policy enforcement point;

wherein said usage quota comprises at least one of a data volume limit and a bandwidth limit, and wherein the user account manager, the request handler, the quota determiner, and the responder are implemented as software stored on a non-transitory computer readable storage medium and executed by a processor.

2. The server according to claim 1, wherein said user account manager is configured to perform at least one of said maintaining and said determining of said available total usage quota on a per user and per service basis; and wherein said request for allocation of a quota is in respect of a specific service.

3. The server according to claim 1, wherein said user account manager is configured to perform at least one of said maintaining and determining of said available total usage quota as a total quota per user for all packet-based services.

4. The server according to claim 1, wherein said user account manager is further configured to update the available total usage quota taking into account said determined quota.

5. The server according to claim 1, wherein each of said connection identifiers comprises one of a Mobile Subscriber Integrated Services Digital Network number (MSISDN), Network Access Identity (NAI), Mobile Station IDentifier (MSID), Mobile Identification Number (MIN), and International Mobile Subscriber Identity (IMSI).

6. The server according to claim 1, wherein said quota determiner is configured to determine the quota for said packet session by:

determining consumed but unreported usage in respect of any of said currently ongoing sessions;

determining an updated available total usage quota taking into account said consumed but unreported usage; and allocating quotas to both new and one or more pre-existing sessions from the updated available total usage quota.

7. The server according to claim 6, said server being configured to provide said policy decision point as a Policy and Charging Rules Function of a 3GPP Policy and Charging Control architecture, wherein said quota determiner is configured to determine consumed but unreported usage in respect of any said currently ongoing sessions by sending a Re-Auth Request (RAR) message over a Gx interface with respect to the or each currently ongoing session.

8. The server according to claim 6, wherein said quota determiner is configured to allocate all of said updated available total usage quota between the new and the one or more pre-existing sessions.

9. The server according to claim 1, wherein said quota determiner is configured to determine the quota by:

deducting from said total usage quota, quotas allocated to said currently ongoing sessions;

reserving an amount of quota as a remaining total usage quota for sessions to be subsequently established; and allocating the remainder, or a part of the remainder, as a quota for the session associated with said specified connection identifier.

10. The server according to claim 9, said server being configured to provide said policy decision point as a Policy and Charging Rules Function of a 3GPP Policy and Charging Control architecture, wherein said quota determiner is configured to determine consumed but unreported usage in respect of any said currently ongoing sessions by sending a Re-Auth Request (RAR) message over a Gx interface with respect to the or each currently ongoing session.

11. The server according to claim 9, wherein said quota determiner is further configured, in the event that said remainder represents an insufficient quota, to:

determine consumed but unreported usage in respect of any said currently ongoing sessions;

determine an updated available total usage quota taking into account that consumed usage; and allocate quotas to both the new and the one or more pre-existing sessions from the updated available total usage quota.

12. The server according to claim 1, wherein said server is configured to provide said policy decision point as a Policy and Charging Rules Function of a 3GPP Policy and Charging Control architecture.

13. The server according to claim 1, wherein said usage quota further comprises a time period.

14. A method of allocating user usage quotas within a packet-based communication network, the method comprising:

performing at least one of a maintaining and a determining, for each of a plurality of users, of an available total usage quota and a set of registered, linked connection identifiers that are associated with a user;

receiving, from a policy enforcement point, a request for allocation of a quota with respect to a packet session associated with a specified connection identifier;

responding to receipt of a quota request by determining a quota for said packet session taking into account the available total usage quota for the associated user and consumed but previously unreported usage quota in respect of any currently ongoing sessions associated with other connection identifiers belonging to the same set as said specified connection identifier, the previously unreported usage quota comprising usage quota unreported before receipt of the request; and sending the determined quota to said policy enforcement point;

wherein said usage quota comprises at least one of a data volume limit and a bandwidth limit.

15. The method according to claim 14, the method being implemented within a network server as part of a 3GPP Policy and Charging Rules Function.

16. The method according to claim 14, wherein said available total usage quota is defined on a per user and service basis; and said request for allocation of a quota is in respect of a specific service.

17. The method according to claim 14, wherein said available total usage quota is defined as a total quota per user for all packet-based services.

18. The method according to claim 14, wherein determining the quota for said packet session comprises:

determining consumed but unreported usage in respect of any said currently ongoing sessions;

determining an updated available total usage quota taking into account that consumed usage; and allocating quotas to both new and one or more pre-existing sessions from the updated available total usage quota.

19. The method according to claim 14, wherein determining the quota for said packet session comprises:

deducting from said total usage quota, quotas allocated to said currently ongoing sessions;

reserving an amount of quota as a remaining total usage quota for sessions to be subsequently established; and allocating the remainder, or a part of the remainder, as a quota for the session associated with said specified connection identifier.

20. A computer program stored in a non-transitory computer readable medium, said computer program configured to cause a computer to:
- perform at least one of a maintaining and a determining, for each of a plurality of users, of an available total usage quota and a set of registered, linked connection identifiers that are associated with a user;
- receiving from a policy enforcement point, a request for allocation of a quota with respect to a packet session associated with a specified connection identifier;
- responding to receipt of a quota request by determining a quota for said packet session taking into account the available total usage quota for the associated user and consumed but unreported usage quota in respect of any currently ongoing sessions associated with other connection identifiers belonging to the same set as said specified connection identifier; and
- sending the determined quota to said policy enforcement point;
- wherein said usage quota comprises at least one of a data volume limit and a bandwidth limit.

* * * * *